(12) United States Patent
Witzel et al.

(10) Patent No.: US 10,258,145 B2
(45) Date of Patent: Apr. 16, 2019

(54) SHELF ATTACHMENT ASSEMBLY

(71) Applicants: Theodore Andrew Witzel, Waterloo (CA); Christopher Orrin Bowser, Waterloo (CA)

(72) Inventors: Theodore Andrew Witzel, Waterloo (CA); Christopher Orrin Bowser, Waterloo (CA)

(73) Assignee: Onward Multi-Corp Inc., Waterloo, Ontario (CA)

( * ) Notice: Subject to any disclaimer, the term of this patent is extended or adjusted under 35 U.S.C. 154(b) by 0 days.

(21) Appl. No.: 15/816,503

(22) Filed: Nov. 17, 2017

(65) Prior Publication Data

US 2018/0140086 A1 May 24, 2018

Related U.S. Application Data

(60) Provisional application No. 62/424,025, filed on Nov. 18, 2016.

(51) Int. Cl.
| | |
|---|---|
| *A47B 5/02* | (2006.01) |
| *A47B 5/04* | (2006.01) |
| *A47F 5/00* | (2006.01) |
| *A47B 13/08* | (2006.01) |
| *A47B 96/02* | (2006.01) |
| *A47J 37/07* | (2006.01) |

(52) U.S. Cl.
CPC ............. *A47B 5/02* (2013.01); *A47B 5/04* (2013.01); *A47B 96/028* (2013.01); *A47B 13/083* (2013.01); *A47F 5/0068* (2013.01); *A47J 37/07* (2013.01)

(58) Field of Classification Search
CPC .. A47B 5/02; A47B 5/04; A47B 5/006; A47B 23/02; A47B 23/025; A47B 96/06; A47B 96/061; A47B 96/028; A47J 37/07; A47J 37/0763; A47J 37/0786; A47J 2037/0777
See application file for complete search history.

(56) References Cited

U.S. PATENT DOCUMENTS 5,076,256 A * 12/1991 Raymer ............... A47J 37/0713
126/25 R
5,941,228 A * 8/1999 McKenzie ............ E05D 7/1061
126/25 R (Continued)

*Primary Examiner* — Daniel J Rohrhoff
(74) *Attorney, Agent, or Firm* — Valauskas Corder LLC

(57) ABSTRACT

A shelf attachment assembly for attaching a shelf to a wall includes a removable shelf having a wall member and a hinge member at an angle to the wall member. The wall member includes a first aperture and a second aperture, the second aperture having a wall member portion as well as a hinge member portion. The shelf attachment assembly also includes a shelf attachment bracket which is fastenable to the wall. The shelf attachment bracket includes a first attachment and a second attachment aligned to receive the first aperture and second aperture, respectfully. The removable shelf is attached to the shelf attachment bracket, firstly, by inserting the second attachment through the hinge member portion of the second aperture. The removable shelf is then rotated such that the second attachment passes into the wall member portion of the second aperture and the first attachment is inserted through the first aperture.

21 Claims, 13 Drawing Sheets

(56) References Cited

U.S. PATENT DOCUMENTS

| | | | | |
|---|---|---|---|---|
| 6,142,140 | A * | 11/2000 | Shumaker | A47B 96/027 108/152 |
| 9,179,769 | B1 * | 11/2015 | Port | A47C 1/12 |
| 2003/0106475 | A1 * | 6/2003 | Chen | A47B 5/006 108/134 |
| 2004/0124327 | A1 * | 7/2004 | Cheng | A47B 5/006 248/244 |
| 2005/0109910 | A1 * | 5/2005 | Vander Berg | A47B 96/027 248/477 |
| 2009/0038983 | A1 * | 2/2009 | Kieffer | A47B 96/028 206/557 |
| 2009/0200254 | A1 * | 8/2009 | Hsu | A47B 96/028 211/90.01 |
| 2012/0017890 | A1 * | 1/2012 | May | A47J 37/0704 126/9 R |
| 2015/0020796 | A1 * | 1/2015 | Garman | A47J 37/0763 126/9 B |
| 2015/0282608 | A1 * | 10/2015 | Sakanoue | B60N 3/002 108/42 |
| 2018/0177337 | A1 * | 6/2018 | Prior | G01N 3/56 |

* cited by examiner

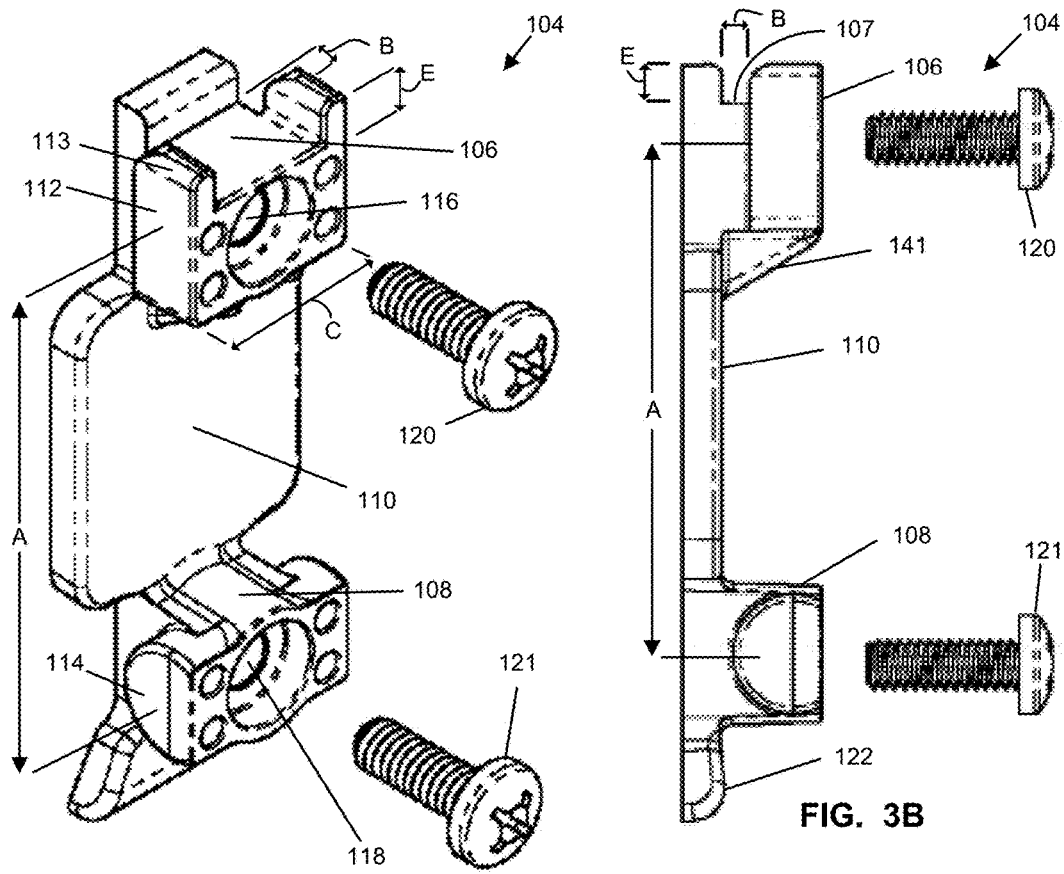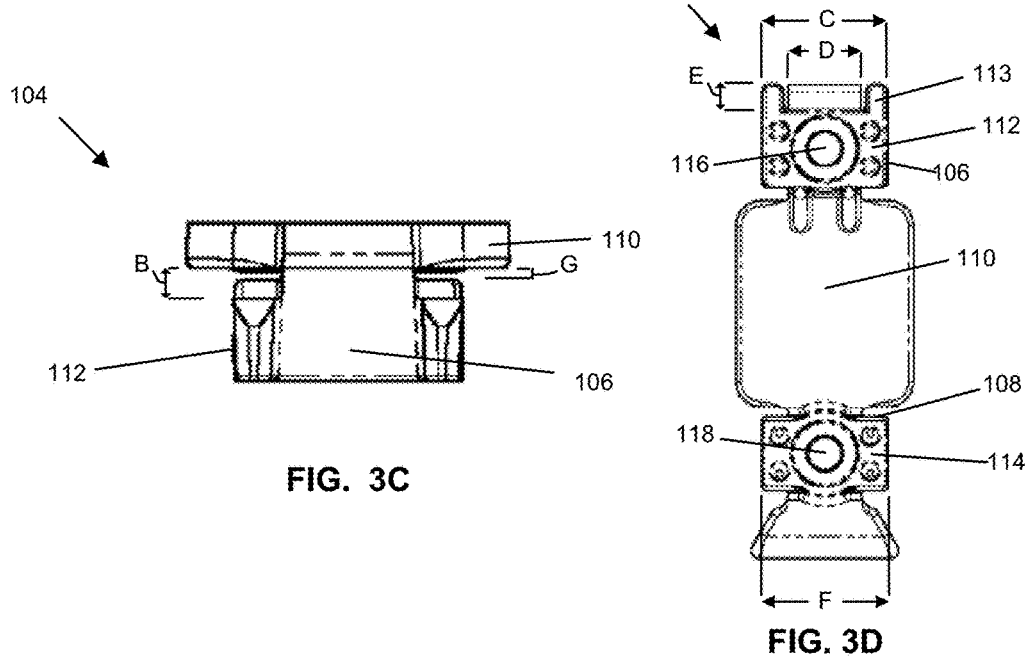

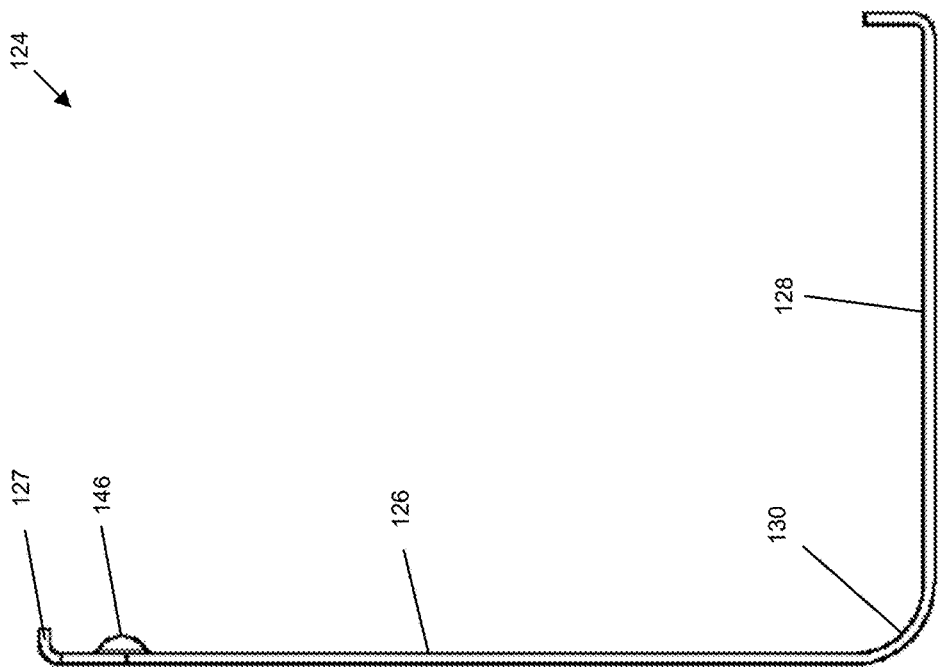
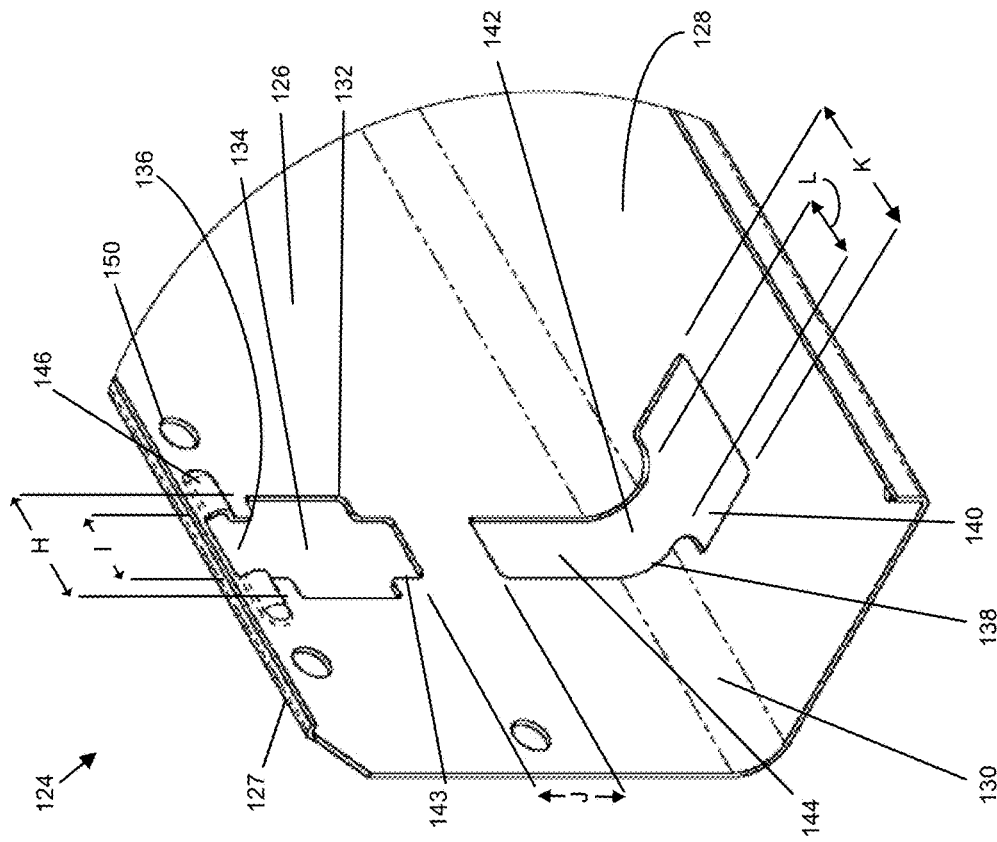
FIG. 4A
FIG. 4B

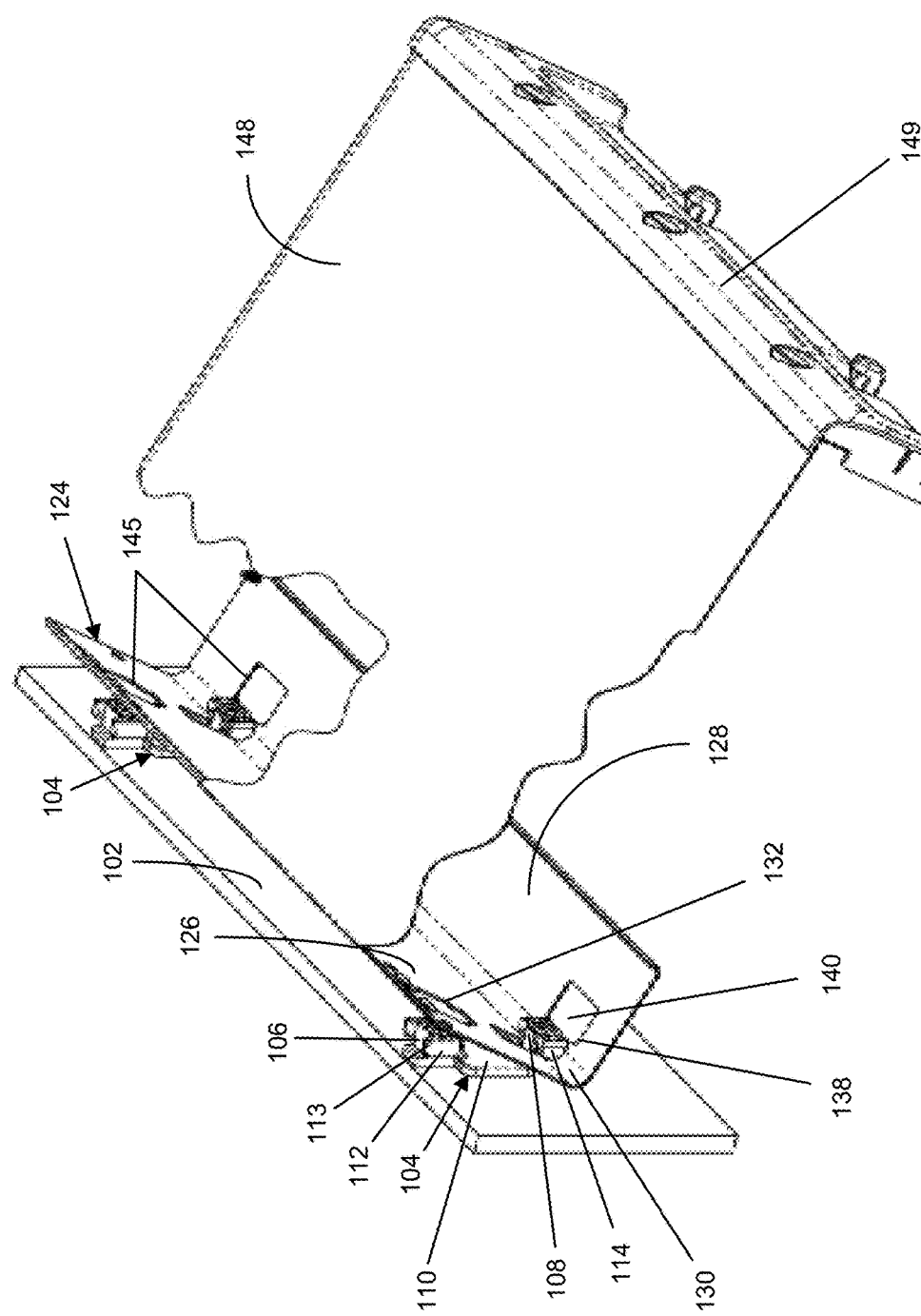

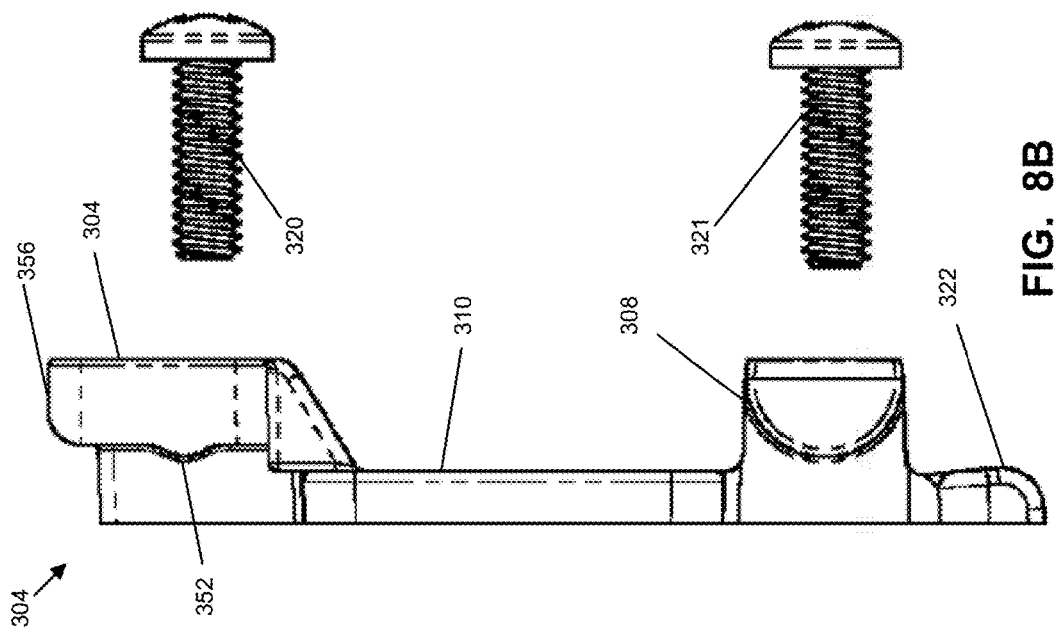
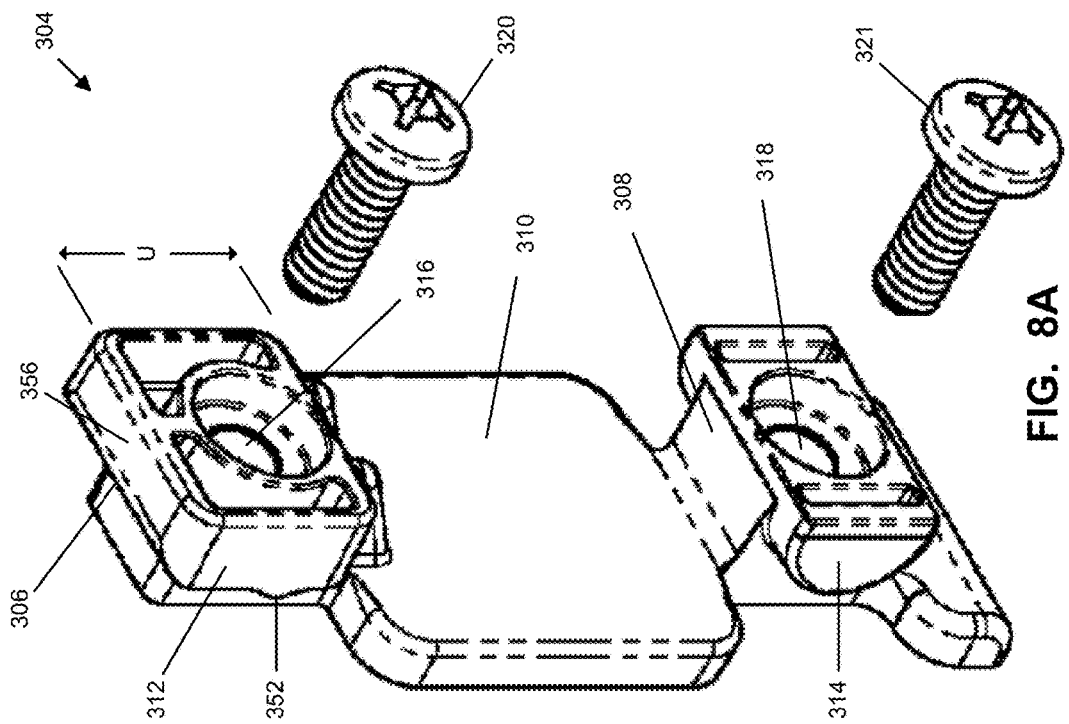

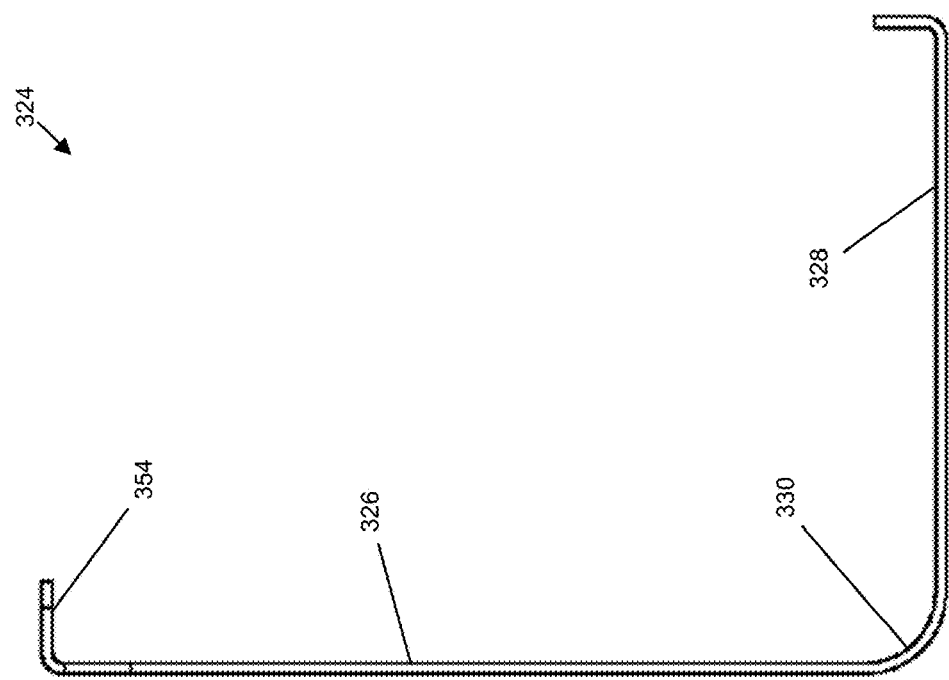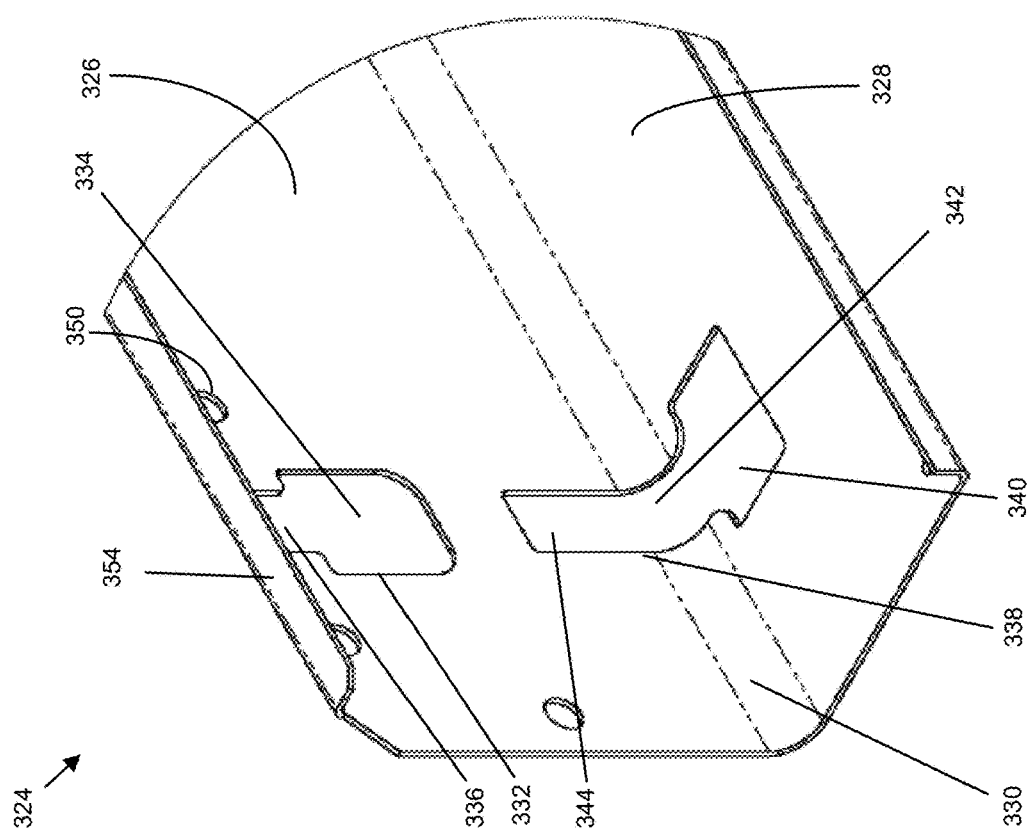

SHELF ATTACHMENT ASSEMBLY

TECHNICAL FIELD

The embodiments disclosed herein relate to a shelf attachment assembly, and in particular, to a shelf attachment assembly and method of assembly to attach a side shelf to a barbeque.

INTRODUCTION

Barbeques, because of shipping requirements, are often transported to a retailer and sold, unassembled, for a user to assemble. The difficulty of assembling barbeques is well-known. Conventional barbeque assembly tends to be complex and involve a lengthy assembly manual or even barbeque assembly instructional classes.

One feature of barbeque assembly that may be difficult to assemble, due to size and weight, is the attachment of side shelfs (also called side tables) which may involve numerous small pieces and the interaction of several components. Further, when the side shelf is attached to the barbeque it may be misaligned, not securely fastened, and can wobble when items are placed on it.

Difficulties experienced when assembling a side shelf to a barbeque are relatable to the experience of attaching a shelf to a wall in general. The challenge of properly leveling a shelf can be difficult, typically involving measuring tape, a level and multiple types of screws, bolts and brackets. In some cases, when a mistake is made during assembly it can be hard to undo as conventional shelfing assemblies may not consider reverse assembly.

Moreover, shelf assemblies, in general, may offer poor adaptability as different types of assemblies may be needed for different types of surfaces and different kinds of use. Furthermore, conventional shelf assemblies may not offer opportunity for modification. For example, if a larger shelf is desired, often a whole new assembly must be installed after the previous shelf is removed. If a single piece of the shelf breaks, a whole new assembly may need to be installed. Conventional shelfs may be limited in design. For example, conventionally, if a user wants a shelf of a different size, the user may need to replace the entire shelf system.

SUMMARY

According to some embodiments, there is a shelf attachment assembly for attaching a shelf to a wall. The shelf attachment assembly includes a removable shelf having a wall member and a hinge member at an angle to the wall member, wherein the wall member includes a first aperture, and wherein the wall member and the hinge member include a second aperture, the second aperture having a wall member portion and a hinge member portion; and a shelf attachment bracket for fastening to the wall having a first attachment for aligning with the first aperture and a second attachment for aligning with the second aperture. The removable shelf is attached to the wall when the second attachment is inserted into the hinge member portion of the second aperture and the removable shelf is rotated such that the second attachment passes into the wall member portion of the second aperture and the first attachment is inserted into the first aperture.

The first attachment may be spaced above the second attachment and the first aperture may be spaced above the second aperture.

The second aperture may be slotted such that the hinge member portion has a wider opening than the wall member portion, and the second attachment may be sized to fit through the wider opening of the hinge member portion but not the wall member portion.

The first aperture may be slotted such that a lower portion of the first aperture has a wider opening than an upper portion of the first aperture, and the first attachment may be sized to fit through the wider opening of the first aperture but not the upper portion of the first aperture.

The removable shelf may further include an arcuate corner member connecting the wall member to the hinge member. The removable shelf may be rotated such that the second attachment passes from the hinge member portion through the corner member and into the wall member portion of the second aperture.

The second attachment may have at least one side overhang for engaging with the wall member.

The overhang of the second attachment may be rounded to accommodate the corner member portion during the rotation of the removable shelf.

The first attachment may have at least one overhang for engaging with the wall member.

The wall member may include at least one ridge adjacent the first aperture for engaging with the overhang of the first attachment.

The overhang may include a protrusion for engaging with the wall member.

The removable shelf may include a ledge member attached at an angle along the length of the wall member for engaging with the overhang of the first attachment.

The first and second attachments may have fastener openings for receiving fasteners.

The shelf attachment assembly may further include first and second fasteners for passing through the fastener openings and attaching the shelf attachment bracket to the wall.

The shelf attachment bracket may include the first attachment, the second attachment separate from the first attachment, and a bracket body separate from the first and second attachments.

The shelf attachment assembly may further include a first fastener for fastening the first attachment to the bracket body and the wall and a second fastener for fastening the second attachment to the bracket body and the wall.

The shelf attachment assembly may further include a second shelf attachment bracket, and the removable shelf may include third and fourth apertures spaced laterally from the first and second apertures for mating with the second shelf attachment bracket.

The removable shelf may have a support surface spanning to a distal end of the removable shelf.

The wall may be a barbeque.

According to some embodiments, there is a method for attaching a removable shelf to a wall. The method includes fastening a shelf attachment bracket to a wall, the shelf attachment bracket having a first attachment and a second attachment, and attaching the removable shelf to the wall. The removable shelf having a wall member for mating with the wall and a hinge member at an angle to the wall member. The wall member includes a first aperture. The wall member and the hinge member include a second aperture. The second aperture having a wall member portion and a hinge member portion. Attaching the removable shelf to the wall includes inserting the second attachment into the hinge member portion of the second aperture, rotating the removable shelf such that the second attachment passes to the wall member portion of the second aperture, and inserting the first attachment into the first aperture.

The first attachment may be spaced above the second attachment and the first aperture may be spaced above the second aperture, and the method may further include lowering the removable shelf after attaching the removable shelf to the wall.

The method may further include tightening fasteners in the shelf attachment bracket after attaching the removable shelf to the wall.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 3A is an exploded side perspective view of a shelf attachment bracket and fasteners of the shelf attachment assembly of FIG. 1;

FIG. 3B is an exploded side plan view of the shelf attachment bracket and fasteners of FIG. 3A;

FIG. 3C is a top plan view of the shelf attachment bracket of FIG. 3A;

FIG. 3D in a front plan view of the shelf attachment bracket of FIG. 3A;

FIG. 4A is a partial side perspective view of a removable shelf of the shelf attachment assembly of FIG. 1;

FIG. 4B is a side plan view of the removable shelf of FIG. 4A;

FIGS. 5A to 5D are detached, first intermediate, second intermediate, and third intermediate positions, respectfully, of the shelf attachment assembly of FIG. 1;

FIGS. 8A and 8B are an exploded side perspective view and an exploded side plan view, respectfully, of a shelf attachment bracket and fasteners in accordance with a further embodiment;

FIGS. 9A and 9B are a partial side perspective view and a side plan view, respectfully, of a removable shelf for the shelf attachment bracket of FIGS. 8A and 8B.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

The inventors have identified an improved assembly and method of assembly for attaching a shelf to a wall. Specifically, an improved assembly and method of assembly for attaching a side shelf to a barbeque. It may be desirable to have an assembly and method of assembly that is simple and that minimizes the struggle of creating a secure and level fit of the shelf to the wall. It may also be desirable to have a system that is adaptable to permit use on a variety of mounting surfaces and for a variety of purposes. Furthermore, it may be desirable to have an assembly and method of assembly that allows for disassembly, modification, and replacement.

Figure 1:
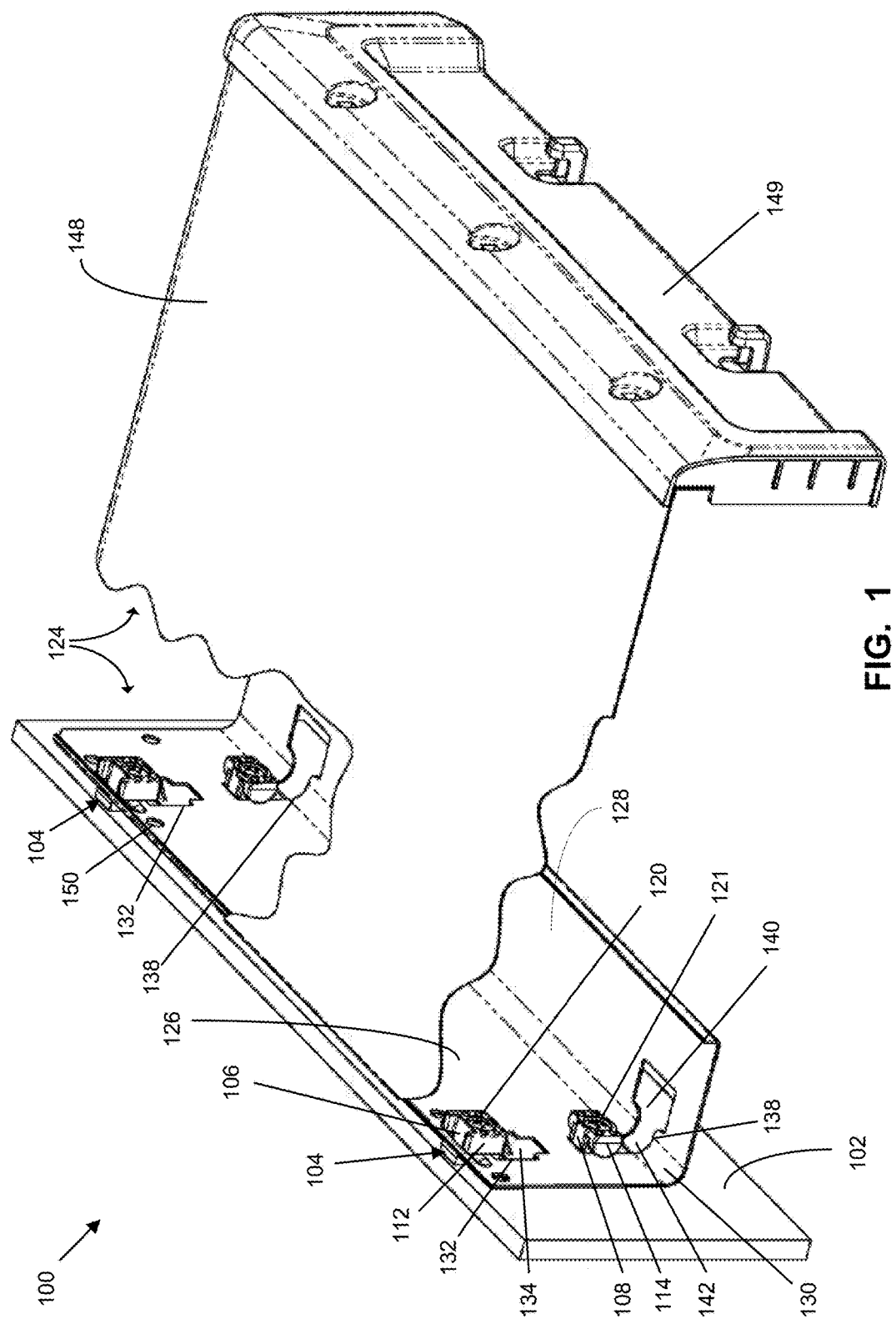
FIG. 1 is a side perspective view of a shelf attachment assembly, in accordance with an embodiment.
Figure 2B:
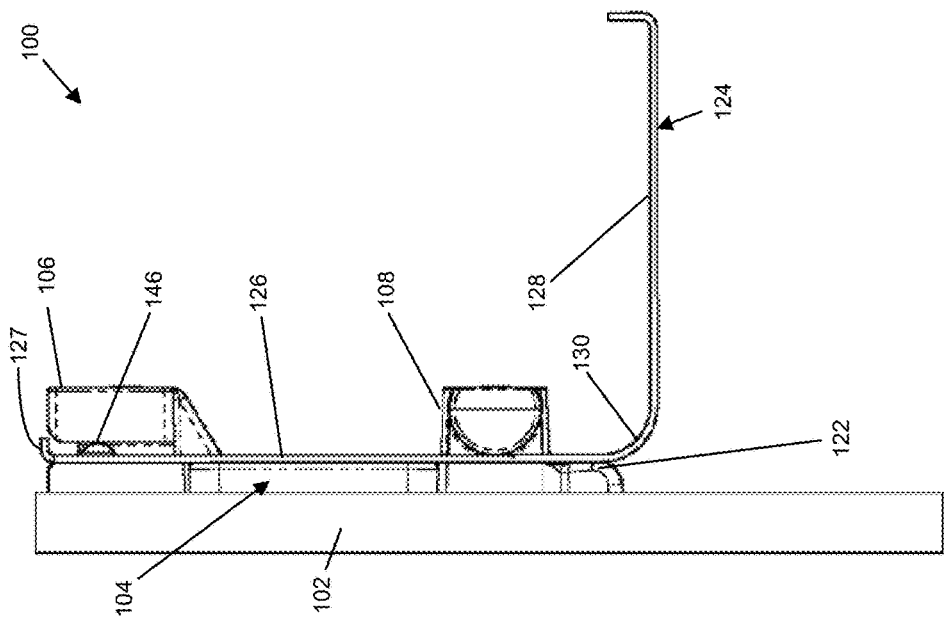
FIG. 2B is a side plan view of the shelf attachment assembly of FIG. 2A.
Figure 2A:
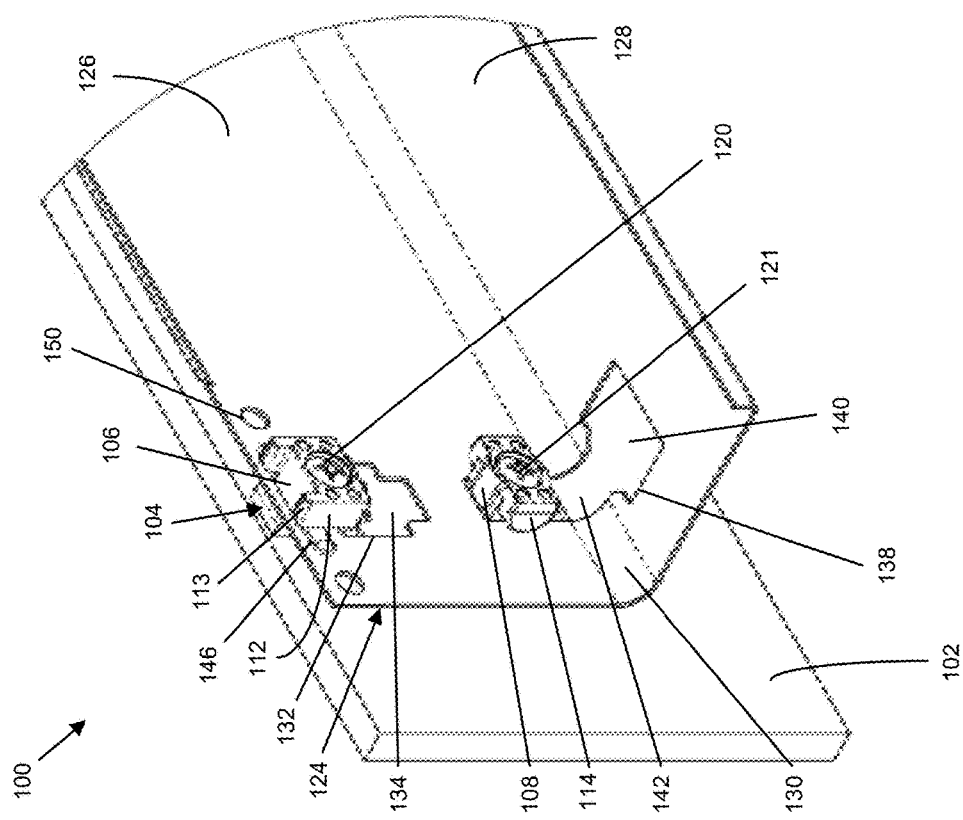
FIG. 2A is an enlarged partial side perspective view of the shelf attachment assembly of FIG. 1.

Referring to FIGS. 1 and 2A-2B, illustrated therein is a shelf attachment assembly 100, in accordance with an embodiment. The shelf attachment assembly 100 is attached to a wall 102 such as a barbeque. The shelf attachment assembly 100 includes two shelf attachment brackets 104 and a removable shelf 124. The removable shelf 124 can serve a number of functions, such as a side table for a barbeque, a display shelf for model cars, a bathroom shelf to store cosmetics, etc.

Figure 5A:
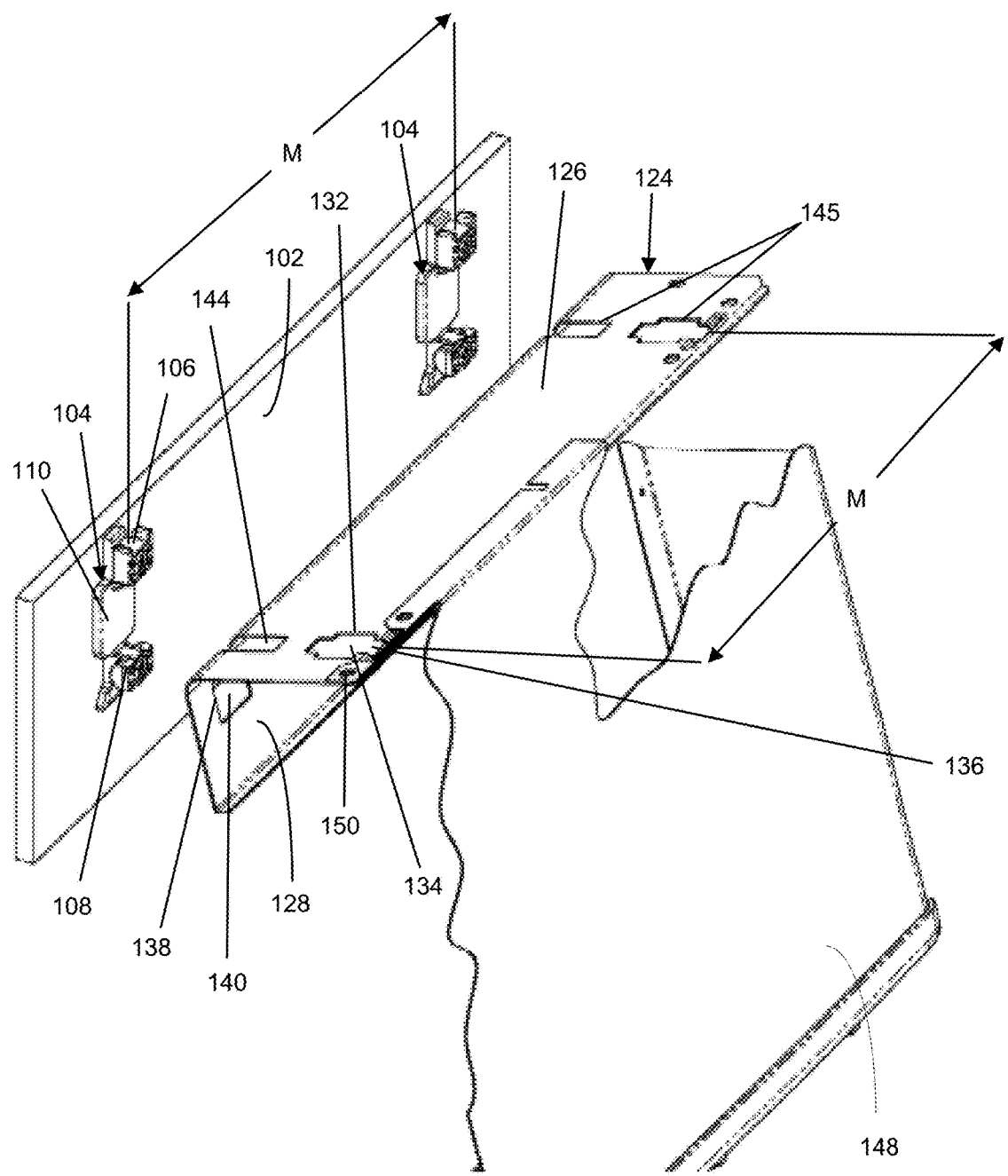
Figure 5B:
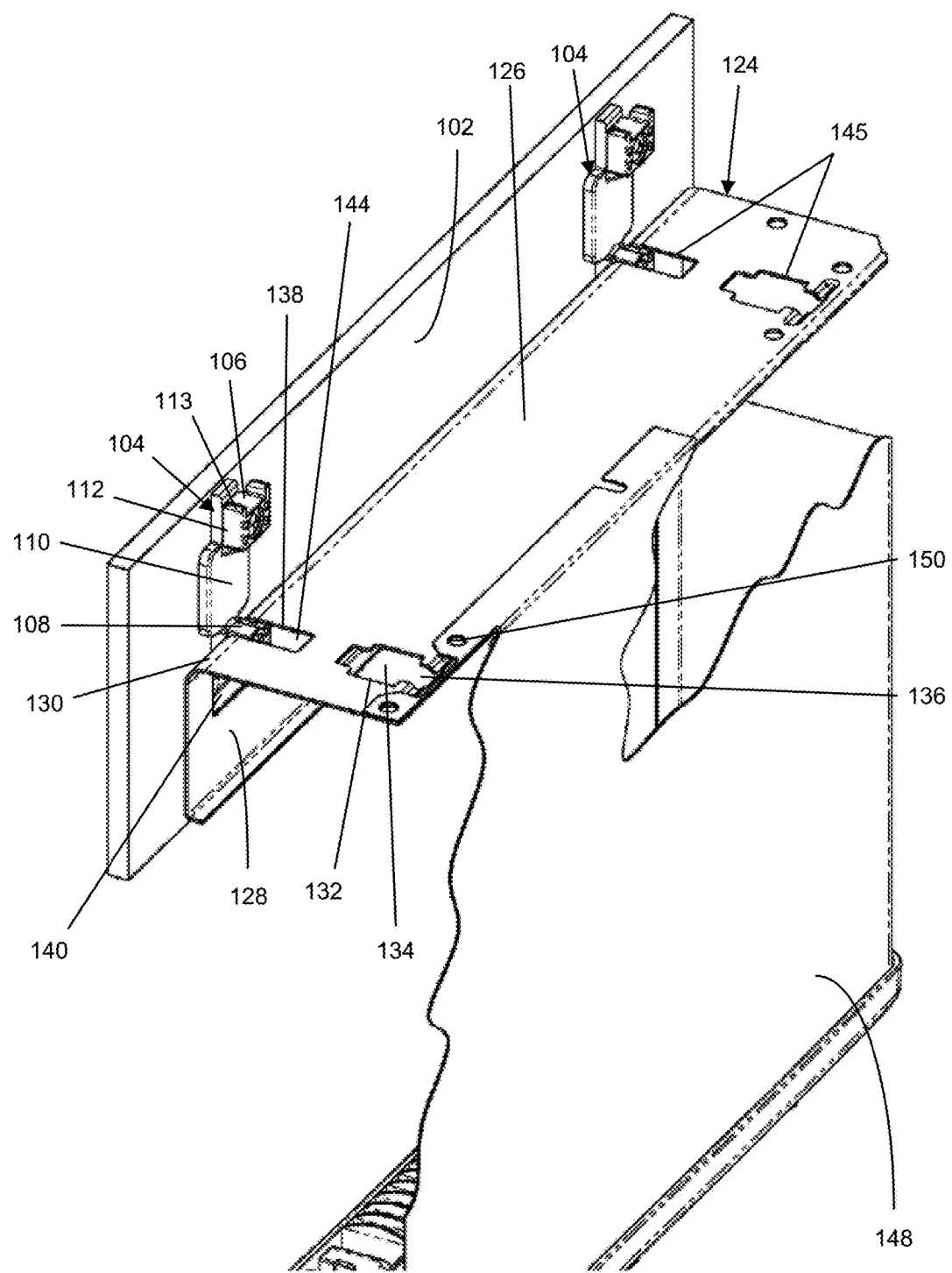

The removable shelf 124 includes a support surface 148 spanning to a distal end 149 of the removable shelf 124. Support surface 148 and removable shelf 124 may be formed in one continuous piece. Alternatively, the support surface 148 may be a separate piece, attachable to the removable shelf 124. Where the removable shelf 124 and the support surface 148 are two pieces, the removable shelf 124 includes openings 150 (FIGS. 5A and 5B) for attaching the support surface 148 with fasteners (not shown). FIGS. 5A and 5B illustrate the attachable support surface 148 attached to the removable shelf 124 at openings 150.

The support surface 148 extends from the wall 102 to the distal end 149 and may be equipped with two hooks. These hooks can be used to hang utensils, keys, or an assortment of other items from the support surface 148. The distal end 149 can take any configuration desired by the user and can be substituted for another distal end if so desired. For example, in an alternate embodiment, the distal end 149 can be includes a ledge member or lip that extends vertically upward from the support surface 148 to prevent objects from rolling or sliding off.

The shelf attachment assembly 100 contains a removable shelf 124 with two sets of first and second apertures 132,138 attached to the two shelf attachment brackets 104. In an alternate embodiment, the removable shelf 124 includes three sets of first and second apertures 132,138 and is attached to three shelf attachment brackets 104. In a further alternate embodiment, the removable shelf 124 includes exactly one set of first and second apertures 132,138 and is attached to exactly one shelf attachment bracket 104. The number of aperture sets on the removable shelf 124 and shelf attachment brackets 104 used in the shelf attachment assembly may be selected based on the required stability, strength and size of the removable shelf 124 and support surface 148.

The shelf attachment assembly 100 includes a removable shelf 124 with a wall member 126 and hinge member 128 aligned at a right angle. This member alignment allows the removable shelf 124 to be positioned in a horizontal orientation after assembly. However, alternative embodiments, not shown in the drawings, are possible when the wall member 126 and the hinge member 128 are not aligned at a right angle. Moreover, regardless of the alignment angle between the wall member and hinge member, support surface 148 can extend from the removable shelf 124 at an angle suitable for the user's needs. For example, in alternate embodiment, the support surface 148 can be angled from the removable shelf to be substantially vertical.

Referring to FIGS. 3A-3D, the shelf attachment bracket 104 includes a first attachment 106 separated by a distance A above a second attachment 108, formed and connected by a bracket body 110. The first attachment 106 includes a first fastener opening 116 and the second attachment 108 includes a second fastener opening 118, for receiving fasteners, such as screws, bolts or nails. The shelf attachment assembly 100 includes a first fastener 120 that passes through first fastener opening 116 and a second fastener 121 that passes through second fastener opening 118. The first fastener 120 and the second fastener 121 secure the shelf attachment bracket 104 to the wall 102. In an alternative embodiment, the shelf attachment bracket 104 is attached with an adhesive to the wall 102.

The first attachment 106 includes at least one overhang 112. The first attachment 106 may contain two overhangs 112 on opposite sides of the first attachment 106. The first attachment 106 is projected off of the bracket body 110 at an offset distance B by a first attachment projector 107. The first attachment 106 has a width C that is wider than a width D of the first attachment projector 107. This difference in width, together with the offset distance B, creates an engagement area between the bracket body 110 and the first attachment 106 where the removable shelf 124 can engage with the overhangs 112. The overhangs 112 include vertical extensions 113 that extend vertically above the first attachment projector 107 a distance E. The vertical extensions 113 enable the first attachment 106 to act as a buttress for the support surface 148, reducing movement and vibration of the support surface 148 after assembly.

The second attachment 108 includes at least one overhang 114. The overhangs 114 may be two rounded side overhangs 114 on opposite sides of the second attachment 108. The rounded side overhangs 114 give the second attachment 108 a width F. In this embodiment, the width F of the second attachment 108 is equal to the width D of the first attachment 106; however, the width D may not equal the width F. The rounded side overhangs 114 extend from the second attachment at a distance G between the side overhangs 114 and the bracket body 110. The distance G is an engagement area for the removable shelf 124 between the bracket body 110 and the rounded side overhangs 114.

Referring to FIGS. 4A-4B, the removable shelf 124 includes a wall member 126 and a hinge member 128 connected (e.g. at a right angle by an arc) by a corner member 130. The corner member 130 may be arcuate. The wall member 126 includes a first aperture 132 which is slotted such that a lower portion 134 with a width H is wider than an upper portion 136 with a width I. The wall member 126 has a second aperture 138, separated by a distance J below the first aperture 132. The second aperture 138 has a hinge member portion 140, a corner member portion 142 and a wall member portion 144. The second aperture 138 is slotted such that a width K of the hinge member portion 140 is wider than a width L of the corner member portion 142 and the wall member portion 144. In this embodiment, the width H equates to the width K and the width I equates to the width L, but may be different in different embodiments. The removable shelf 124 includes a lip member 127 that spans the top length of the wall member 126. The lip member 127 assists in the attachment and alignment of the support surface 148 to the removable shelf 124. In an alternative embodiment the lip member 127 extends to span to the distal end 149 of the removable shelf 124.

Referring to FIGS. 5A-5D and FIG. 1, the removable shelf attachment assembly 100 is assembled in a sequential method. The sequential assembly method can be observed in the following figure order to install: FIG. 5A to FIG. 5B to FIG. 5C to FIG. 5D to FIG. 1. The sequential method can be reversed to uninstall. The convenience of disassembling the removable shelf 124 from the shelf attachment bracket 104, in the reverse method from which it was assembled, may be advantageous where the shelf attachment assembly is connected to a moveable object. For example, if a barbeque is transported to another location, removing the side shelfs may improve transportation as the barbeque is more compact.

The two shelf attachment brackets 104, spaced laterally apart at a distance M, are fastened to the wall 102. The removable shelf 124 has two sets of first and second apertures 145 spaced laterally apart by a distance M. The lateral spacing of the shelf attachment brackets 104 fastened to the wall is set to correspond with the lateral spacing of aperture sets 145 on the removable shelf 124.

In FIG. 5A the removable shelf 124 is oriented such that the hinge member 128 faces the wall 102.

In FIG. 5B the hinge member 128 is positioned against wall 102. The second attachments 108 are inserted in the hinge member portions 140 of second apertures 138. If the sequential assembly method is paused at this stage, the removable shelf 124 will not fall downward to the ground if released. The width F of the second attachments 108 (e.g. described with respect to FIGS. 3A-3D) is wider than the width L of the wall member portions 144 of the second apertures 138. This difference in width allows the removable shelf 124 to suspend from the rounded side overhangs 114 of the second attachments 108 without falling through the second apertures 138. This intermediate position, in which the removable shelf 124 is suspended in a non-fixed position from the second attachments, can serve as a storage position. This storage position may be useful for assemblies in which the support surface 148, extending substantially horizontal from the removable shelf 124, takes up space when fully assembled. Reserve assembly to this intermediate position allows the support surface 148 to be suspended vertically alongside the wall 102, saving space.

In FIG. 5C the removable shelf 124 is in the process of being rotated. The second attachments 108 are positioned in the corner member portions 142 of the second apertures 138. The rounded side overhangs 114 of second attachment 108 and corner member 130 accommodate the rotation of the removable shelf 124. Since the width F of the second attachments 108 (e.g. described with respect to FIGS. 3A-3D) is wider than the width L of the corner member portions 142 (e.g. described with respect to FIGS. 4A-4B), the second attachments 108 remain engaged with second apertures 138 during rotation.

Figure 5D:
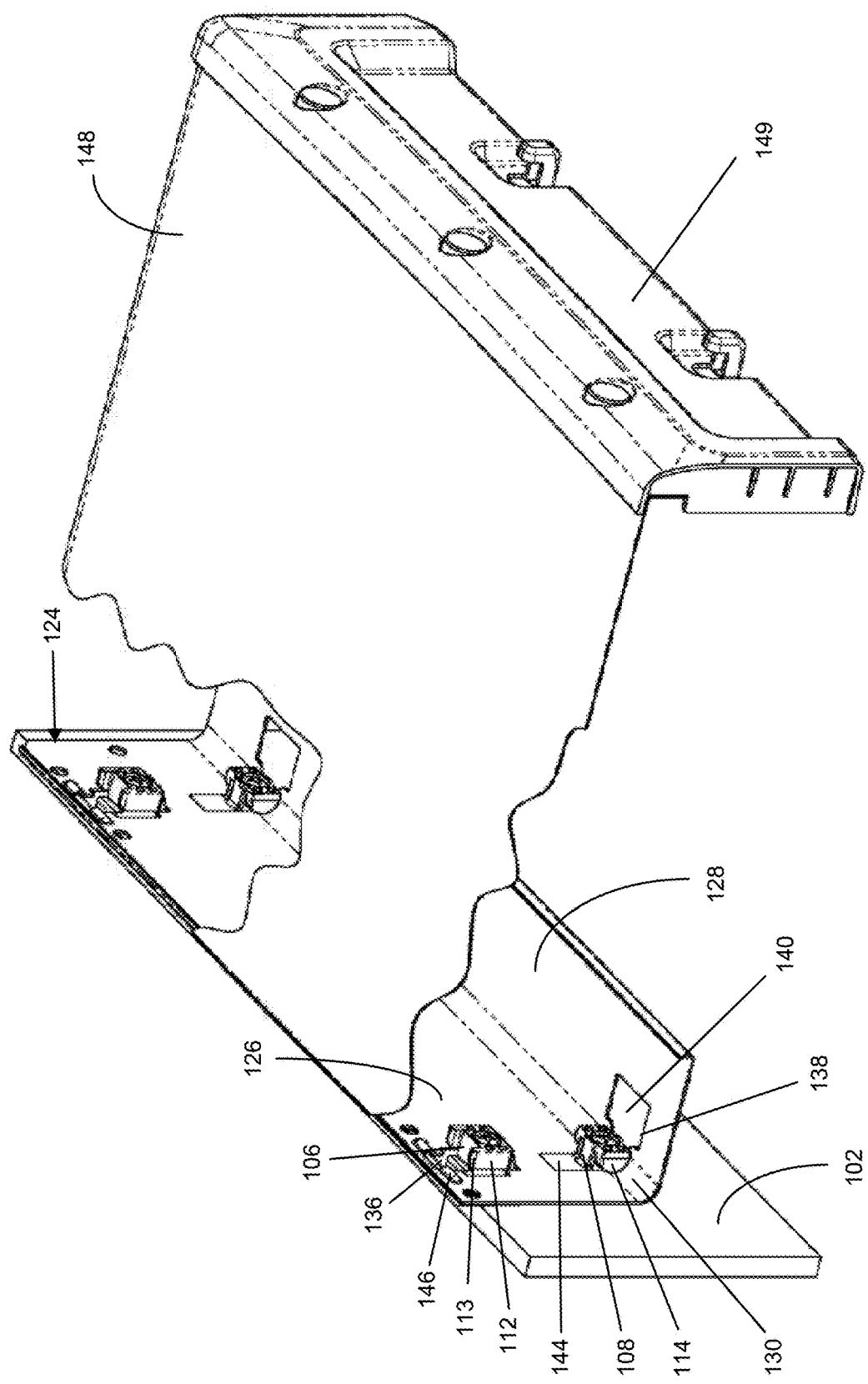

In FIG. 5D the removable shelf 124 is rotated fully. The wall member 126 is positioned to face the wall 102. The first attachments 106 are inserted through the lower portions 134 of the first apertures 132. Second attachments 108 are in the corner member portions 142 of the second aperture 138.

In FIG. 1 the removable shelf 124 is secured on the shelf attachment brackets 104. The removable shelf 124 is lowered from the intermediate position in FIG. 5D. The first attachments 106 move from the lower portions 134 into the upper portions 136 of the first apertures 132. When located in the upper portions 136, the first attachments 106 are prevented from freely rotating back to the intermediate position of FIG. 5B because the width of the first attachment 106 (width C, as described in FIGS. 3A-3D) is greater than the width of the upper portions 136 (width I, as described in FIGS. 4A-4B) of the first aperture 132. The second attachments 108 are positioned in the wall member portions 144 of the second apertures 138. Since the width F of the second attachments 108 (e.g. described with respect to FIGS. 3A-3D) is wider than the width L of the wall member portions 144 (e.g. described with respect to FIGS. 4A-4B), the second attachments 108 do not disengage with second apertures 138 after assembly is complete.

Referring again to FIGS. 4A-4B, the removable shelf 124 includes ridges 146 formed on opposite sides of the upper portion 136 of the first aperture 132. As described with respect to FIGS. 3A-3D, an engagement area is created between the first attachment 106 and the bracket body 110, by the difference between the width C of the first attachment 106 and the width D of the first attachment projector 107. The distance E of the first attachment projector 107 raises the first attachment 106 off of the bracket body 110. This engagement area provides a gap for the removable shelf 124 in which the removable shelf 124 can engage with the overhangs 112 of the first attachment 106. As shown in FIGS. 2A-2B, ridge 146 is snug fit in the engagement area between the overhangs 112 and the wall member 126 and may reduce movement or vibration of the removable shelf 124 after assembly.

Referring again to FIG. 3B, shelf attachment bracket 104 has a crest 122 formed below the second attachment 108 on the bracket body 110. The crest 122 engages with the wall member 126 creating a point of contact between the removable shelf 124 and the shelf attachment bracket 10 to reduce movement of the removable shelf 124 after assembly.

The attachment 104 includes a gusset 141 below the first attachment 106. The gusset 141 is wedge shaped and braces the first attachment 106. The first aperture 134 includes a bottom slot 143. The bottom slot 143 of the first aperture 134 is clearance for the gusset 141 when the shelf 124 is lifted up out of engagement. The bottom slot 143 has a reduction of width that may add strength to the shelf 124 and increase supportive area J while still accommodating the gusset 141.

The embodiments of shelf attachment assembly described are modifiable, allowing their user the ability to adapt the removable shelf assembly to their specific needs. As seen at FIGS. 5A-5B, the support surface 148, which is attachable and detachable from the removable shelf 124, may permit the user to make modifications to the assembly when desired. For instance, if a larger support is required, the user can substitute the existing support surface 148 with a larger one.

Figure 6:
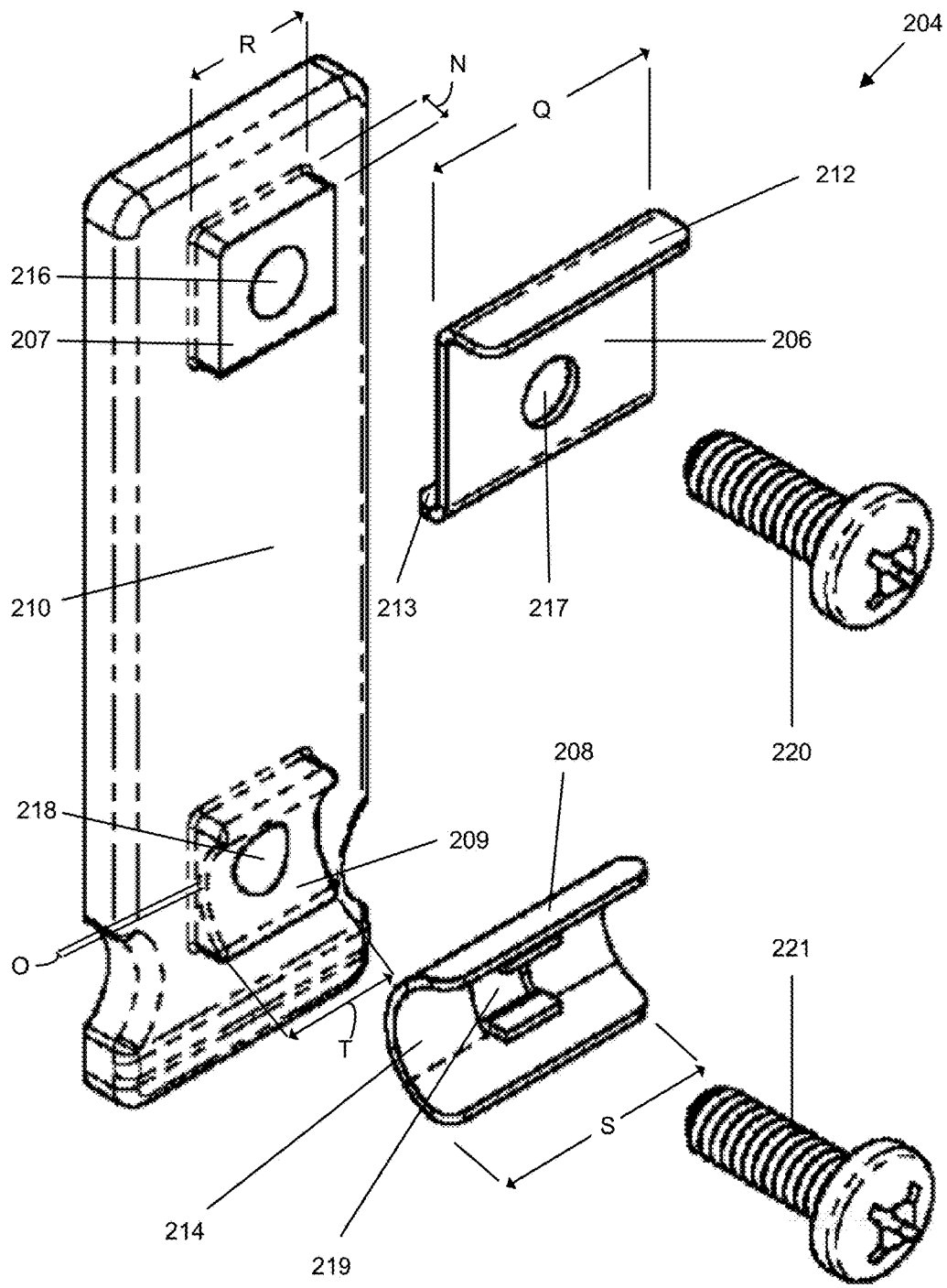
FIG. 6 is an exploded side perspective view of a modular shelf attachment bracket, in accordance with an embodiment.
Figure 7:
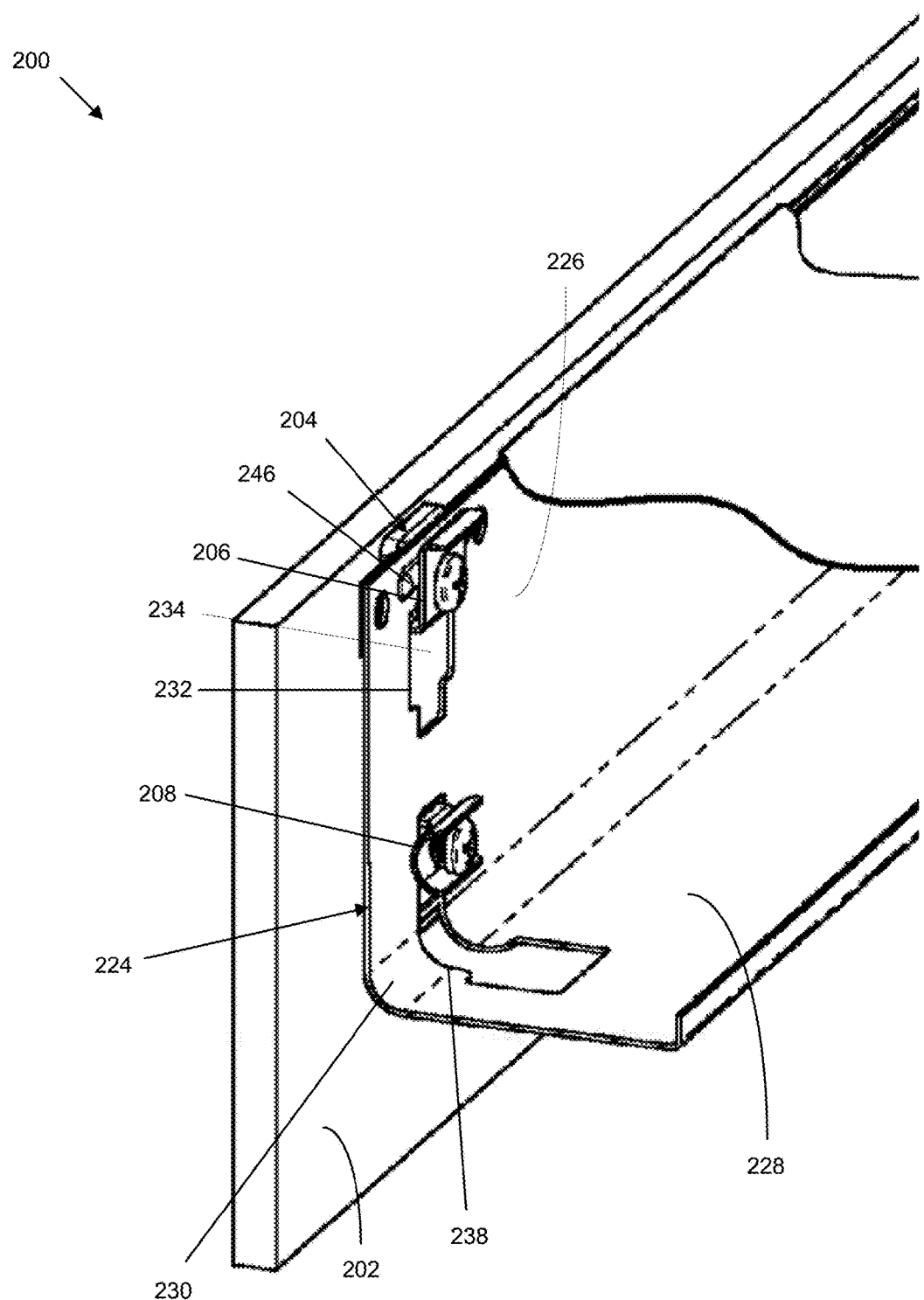
FIG. 7 is a partial side perspective view of a shelf attachment assembly having the modular shelf attachment bracket of FIG. 6.

Referring now to FIGS. 6 and 7, illustrated therein is a shelf attachment assembly 200, in accordance with a further embodiment. The shelf attachment assembly 200 includes a modular shelf attachment bracket 204 and a removable shelf 224 (such as the removable shelf 124 described with respect to FIG. 1).

Modular shelf attachment bracket 204 includes a first attachment 206, a second attachment 208, and a bracket body 210. The bracket body 210 includes a first projector 207 for raising the first attachment 206 a distance N off of the bracket body 210 and a second projector 209 for raising the second attachment 208 a distance O off of the bracket body 210. The distance N and the distance O act in a similar manner as the distance B and the distance G, as illustrated in FIG. 3A-3D.

The first attachment 206 with a width Q is wider than the first projector 207 with a width R. The difference in width between the width Q and the width R, in combination with the distance N, provide an engagement area where the first attachment 206 can engage with the first aperture 232. The first attachment 206 has a top ledge 212 that spans the top length of the first attachment 206 at a right angle. When the first attachment 206 is engaged with the upper portion 236 of the first aperture 232, the top ledge 212 rests (e.g. flush) on the underside of a support surface 248 to prevent wobble of the removable shelf 224. The first attachment 206 has a rounded bottom lip 213 that spans the bottom length of the first attachment 206. The rounded bottom lip 213 acts as a spacer which prevents the first attachment 206 from attaching directly against the first projector 207. The rounded bottom lip 213 creates a gap where the first aperture can engage 232 with the first attachment 206. Furthermore, the rounded bottom lip 213 acts as a crevasse to receive the lower portion 234 of the first aperture 232 to reduce movement of the removable shelf 224 after assembly.

The second attachment 208 is rounded to accommodate for the rotation of removable shelf 224. The second attachment 208 is substantially "C"-shaped when viewed from the side. The second attachment 208 includes two rounded side overhangs 214 having a width S greater than a width T of the second projector 209. The difference in width between the width S and the width T creates an engagement area for the removable shelf 224 between the bracket body 210 and the second attachment 208.

The first attachment 206 includes a first attachment fastener opening 217 for received a first fastener 220. The second attachment 208 includes a second attachment fastener opening 219 for receiving a second fastener 221. Body bracket 210 includes a first fastener opening 216 for receiving the first fastener 220 and a second fastener opening 218 for receiving the second fastener 221. The first attachment fastener opening 217 is aligned with the first fastener opening 216 and the second attachment fastener opening 219 is aligned with the second fastener opening 218. This alignment allows the first fastener 220 to pass through both the first fastener opening 216 and the first attachment fastener opening 217 and the second fastener 221 to pass through both the second fastener opening 218 and the second attachment fastener opening 219. The first fastener 220 and the second fastener 221 secure the shelf attachment bracket 204 to a wall 202.

When attaching the first attachment 206 to the attachment bracket 210, the first fastener 220 may not be fully tightened. A loose connection between the first attachment 206 and attachment bracket 210 may allow for an easier engagement of the first aperture 232 between the first attachment 206 and the bracket body 210. After the shelf attachment assembly 200 has been fully assembled, the first fastener 220 may be tightened to create a snug fit between the first aperture 232 and the first attachment 206, thereby creating a snug fit between the removable shelf 224 and the modular shelf attachment bracket 204.

FIGS. 1, 2A-2B, 5A-5B and 7 illustrate shelf attachment assemblies 100 and 200 attached to walls 102 and 202, respectfully. The wall 102,202 can be a barbeque. The wall 102,202 is not limited to a traditional wall. For example, in alternate embodiments the wall 102,202 can be the side of a computer desk or a food truck in which a side shelf is attached.

In a variant, the first attachment 206 and second attachment 208 are connected directly to the wall 202. In this case, the bracket body 210 is an integral part of the wall 202 and the wall 202 includes the first projector 207, the second projector 209, and the bracket body 210. Alternatively, the first projector 207 and second projector 209 are incorporated into the first attachment 206, and the second attachment 208 and simply connect directly to the wall 202. In this case, the width or height of the bracket body 210 is not limited in size and may be the whole side of the wall 202 (e.g., the whole side of a barbeque).

In a variant, third or more additional shelf attachment assemblies 100, 200 may be further attached to the wall 102, 202 to provide further stability for the removable shelf 124.

In a variant, the bracket 210 may span across the wall 202 to support both sides of the shelf 124. The bracket 210 may include first attachment 206 and second attachment 208 having widths Q,S that are much longer than shown in FIG. 6. For example, the bracket 210 may span the width of the shelf 124. In this case, the shelf 124 of FIG. 4A functions in a similar manner, with widths H,I,L,K wide enough to connect the apertures 134, 142 through length M (of FIG. 5A) such that the outer edges/faces of attachments 112, 114 (of FIG. 3A) connect to the shelf 124.

Referring to FIGS. 8A-9B illustrated therein is a shelf attachment bracket 304 and a removable shelf 324, in accordance with a further embodiment. The shelf attachment bracket 304 includes a first attachment 306 with overhangs 312 that have protrusions 352. The protrusions 352 are formed on the wall-facing side of the first attachment 306. The protrusion 352 is snug fit in the engagement area between overhangs 312 and wall member 326 to reduce movement and vibration of the removable shelf 324 after assembly (not shown). The protrusion 352 may act in a similar manner as ridge 146, as illustrated in FIG. 2A-2B.

The removable shelf 324 includes a flat wall member 326. The removable shelf 324 does not contain ridges (e.g. ridges 146 as shown in FIGS. 4A-4B). The removable shelf 324 includes a ledge member 354 attached at a right angle to the length of wall member 326 for engagement with the first attachment 306. Overhang 312 of the first attachment 306 has a height U such that an upper surface 356 rests flush against ledge member 354 to reduce movement and vibration of the removable shelf 324 after assembly (not shown).

Figure 10:
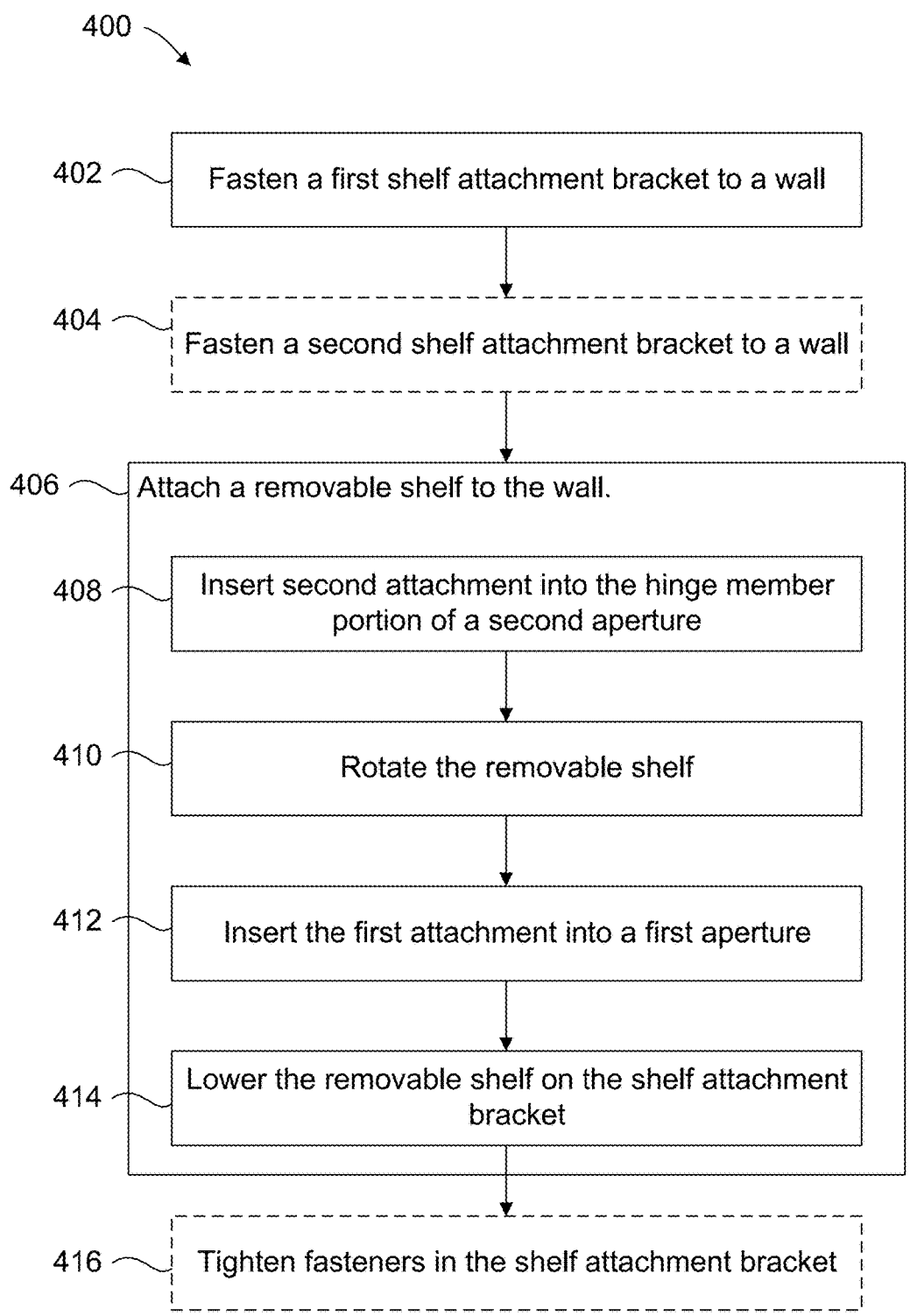
FIG. 10 is a flow chart of a method for shelf assembly, in accordance with an embodiment.

Referring now to FIG. 10, illustrated therein is a method 400 for attaching a removable shelf to a wall, in accordance with an embodiment. The method 400 may include the assembly of the removable shelf assembly as described with respect to FIGS. 1 to 9B.

At 402, a first shelf attachment bracket is fastened to a wall. The attachment bracket has a first attachment spaced above a second attachment. For example, a user screws fasteners through the first attachment bracket and into the wall. The fasteners may be screws or bolts that can be hand-tightened such that the first attachment bracket is fixed and does not move with respect to the wall.

At 404, optionally, a second shelf attachment bracket is similarly fastened to the wall. The second shelf attachment bracket is spaced laterally from the first shelf attachment bracket (see, for example, FIG. 5A). The second shelf attachment bracket has a third and fourth attachment. The second shelf attachment bracket may be attached in a position horizontal to the first attachment bracket and fastened to the wall at the same height. Optionally, third or more additional shelf attachment brackets may be further attached to the wall to provide further stability for the removable shelf.

At 406, a removable shelf is attached to the wall. The removable shelf has a wall member and hinge member at an angle to the wall member. The wall member includes a first aperture. The wall member and hinge member include a second aperture having a wall member portion and hinge member portion. The removable shelf includes a first aperture and second aperture spaced laterally apart from a third aperture and fourth aperture at a distance such that the apertures of the removable shelf correspond with the attachments of the shelf attachment brackets.

At 408, the second attachment and fourth attachment are inserted into the hinge member portion of the second aperture and fourth aperture, respectively. In this intermediate position (see, for example, FIG. 5B) the hinge member faces the wall.

At 410, the removable shelf is rotated (see, for example, FIG. 5C). The removable shelf is rotated such that the second attachment and fourth attachment pass from the hinge member portions of the second aperture and fourth aperture, respectfully, to the wall member portions. The wall member portion of the second aperture is slotted to be narrower than the hinge member portion of the second aperture. This difference is width prevents the second attachment and fourth attachment, which are wider than the wall member portion of the apertures, from disengaging with the removable shelf after rotation.

At 412, with the second attachment and fourth attachment in the wall member portion of the second aperture and fourth aperture, respectfully, the first attachment and third attachment are inserted into the first aperture and third aperture. In this intermediate position (see, for example, FIG. 5D), the wall member faces the wall.

At 414, the removable shelf is lowered on the shelf attachment brackets to secure the removable shelf in place (see, for example, FIG. 1). The first aperture and third aperture are slotted such that their upper portions are narrower than their lower portions. The upper portions of the first aperture and third aperture are also narrower than the side overhang of the first attachment and third attachment. The lowering of the removable shelf engages the first attachment and third attachment with the upper portions of the first aperture and third aperture, respectfully, preventing the attachments from disengaging with the apertures and freely rotating back to the position in 408.

At 416, optionally, the shelf attachment assembly may be made more secure through the tightening of the fasteners used in 402 to attach the shelf attachment bracket(s) to the wall.

While the above description provides examples of one or more apparatus, methods, or systems, it will be appreciated that other apparatus, methods, or systems may be within the scope of the claims as interpreted by one of skill in the art.

The invention claimed is:

1. A shelf attachment assembly for attaching a shelf to a wall, the shelf attachment assembly comprising:
   a removable shelf having a wall member and a hinge member at an angle to the wall member, wherein the wall member includes a first aperture, and wherein the wall member and the hinge member include a second aperture, the second aperture having a wall member portion and a hinge member portion; and
   a shelf attachment bracket for fastening to the wall having a first attachment for aligning with the first aperture and a second attachment for aligning with the second aperture;
   wherein the removable shelf is attached to the wall when the second attachment is inserted into the hinge member portion of the second aperture and the removable shelf is rotated such that the second attachment passes into the wall member portion of the second aperture and the first attachment is inserted into the first aperture.

2. The shelf attachment assembly of claim 1, wherein the first attachment is spaced above the second attachment and wherein the first aperture is spaced above the second aperture.

3. The shelf attachment assembly of claim 1, wherein the second aperture is slotted such that the hinge member portion has a wider opening than the wall member portion, and wherein the second attachment is sized to fit through the wider opening of the hinge member portion but not the wall member portion.

4. The shelf attachment assembly of claim 1, wherein the first aperture is slotted such that a lower portion of the first aperture has a wider opening than an upper portion of the first aperture, and wherein the first attachment is sized to fit through the wider opening of the first aperture but not the upper portion of the first aperture.

5. The shelf attachment assembly of claim 1, wherein the removable shelf further comprises an arcuate corner member connecting the wall member to the hinge member and wherein the removable shelf is rotated such that the second attachment passes from the hinge member portion through the corner member and into the wall member portion of the second aperture.

6. The shelf attachment assembly of claim 5, wherein the second attachment has at least one side overhang for engaging with the wall member.

7. The shelf attachment assembly of claim 6, wherein the overhang of the second attachment is rounded to accommodate the corner member portion during the rotation of the removable shelf.

8. The shelf attachment assembly of claim 1, wherein the first attachment has at least one overhang for engaging with the wall member.

9. The shelf attachment assembly of claim 8, wherein the wall member includes at least one ridge adjacent the first aperture for engaging with the overhang of the first attachment.

10. The shelf attachment assembly of claim 8, wherein the overhang includes a protrusion for engaging with the wall member.

11. The shelf attachment assembly of claim 8, wherein the removable shelf includes a ledge member attached at an angle along the length of the wall member for engaging with the overhang of the first attachment.

12. The shelf attachment assembly of claim 1, wherein the first and second attachments have fastener openings for receiving fasteners.

13. The shelf attachment assembly of claim 12 further comprising first and second fasteners for passing through the fastener openings and attaching the shelf attachment bracket to the wall.

14. The shelf attachment assembly of claim 1, wherein the shelf attachment bracket includes:
   the first attachment;
   the second attachment separate from the first attachment; and
   a bracket body separate from the first and second attachments.

15. The shelf attachment assembly of claim 14 further comprising:
   a first fastener for fastening the first attachment to the bracket body and the wall; and
   a second fastener for fastening the second attachment to the bracket body and the wall.

16. The shelf attachment assembly of claim 1 further comprising a second shelf attachment bracket, and wherein the removable shelf includes third and fourth apertures spaced laterally from the first and second apertures for mating with the second shelf attachment bracket.

17. The shelf attachment assembly of claim 1, wherein the removable shelf has a support surface spanning to a distal end of the removable shelf.

18. The shelf attachment assembly of claim 1, wherein the wall is a barbeque.

19. A method for attaching a removable shelf to a wall, the method comprising:
   a) fastening a shelf attachment bracket to a wall, the shelf attachment bracket having a first attachment and a second attachment; and
   b) attaching the removable shelf to the wall, the removable shelf having a wall member for mating with the wall and a hinge member at an angle to the wall member, wherein the wall member includes a first aperture, and wherein the wall member and the hinge member include a second aperture, the second aperture having a wall member portion and a hinge member portion, wherein attaching the removable shelf to the wall includes:
      i) inserting the second attachment into the hinge member portion of the second aperture;
      ii) rotating the removable shelf such that the second attachment passes to the wall member portion of the second aperture; and
      iii) inserting the first attachment into the first aperture.

20. The method of claim 19, wherein the first attachment is spaced above the second attachment and the first aperture is spaced above the second aperture, and wherein the method further comprises lowering the removable shelf after attaching the removable shelf to the wall.

21. The method of claim 20 further comprising tightening fasteners in the shelf attachment bracket after attaching the removable shelf to the wall.

* * * * *